Figure 1:
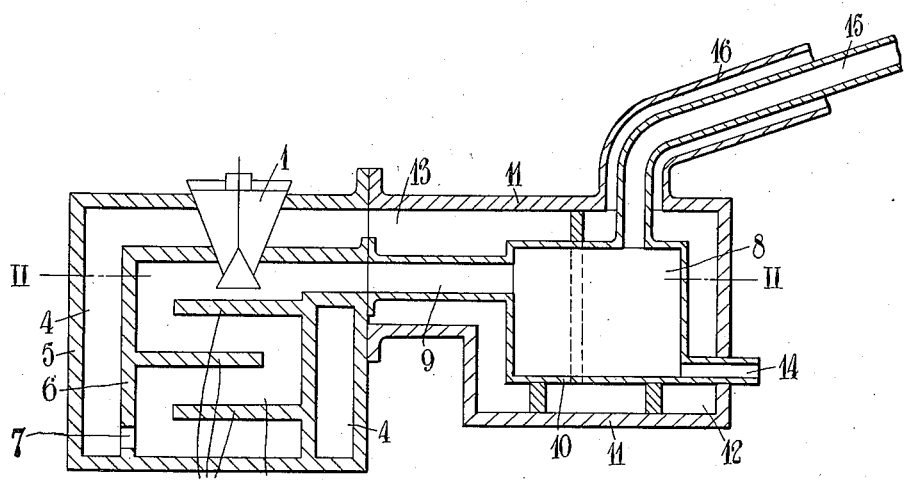

Dec. 4, 1923.

C. S. ROBINSON 1,476,645

RECOVERY AND REFINING OF SULPHUR

Filed July 13, 1922

Inventor
C.S.Robinson
By Markel&Clerk
Atty's

Patented Dec. 4, 1923.

1,476,645

UNITED STATES PATENT OFFICE.

CHARLES STANLEY ROBINSON, OF SOMERSET WEST, CAPE OF GOOD HOPE, SOUTH AFRICA.

RECOVERY AND REFINING OF SULPHUR.

Application filed July 13, 1922. Serial No. 574,754.

*To all whom it may concern:*

Be it known that I, CHARLES STANLEY ROBINSON, a subject of the King of Great Britain and Ireland, and residing at Somerset West, in the Province of the Cape of Good Hope, in the Union of South Africa, have invented certain new and useful Improvements in and Relating to the Recovery and Refining of Sulphur, of which the following is a specification.

This invention relates to the recovery and refining of sulphur.

It is known that while the crude sulphur obtained from sulphur wells in the United States and from the mines in Sicily possesses a high degree of purity and is commonly guaranteed as being 99.5 per cent pure, it will not burn satisfactorily, due to the fact that it contains traces of impurities presumably of the character of petroleum. Not only does the presence of this small proportion of impurity result in the formation of a film over the burning sulphur, which finally extinguishes the flame, but it also affects the colour of the sulphur.

In the majority of types of modern sulphur burners used in connection with the manufacture of sulphuric acid, as the sulphur is subjected to agitation while undergoing combustion, the presence of this impurity does not render the sulphur open to objection. On the other hand, in burning sulphur for the purpose of treating fruit with sulphur dioxide or for fumigating generally, the sulphur undergoing combustion is not subjected to agitation, consequently crude sulphur of the character in question cannot be used.

The bad colour of the sulphur due to the presence of the impurity also raises prejudice in the minds of agriculturists.

In the production of sulphur from sulphur ores the temperature of the ore treated is according to the usual practice followed in Italy, for instance, raised sufficiently to cause the sulphur to melt and separate in the molten condition from the gangue with which it is associated by burning a portion of the sulphur in the ore, the crude sulphur thereby produced being refined if a product of greater purity is required by distillation in externally heated retorts.

The object of the present invention is to provide a process of recovering sulphur from materials containing sulphur in the free state whereby sulphur of an increased degree of purity may be obtained and in particular to provide an improved process of purifying or refining commercial grades of crude sulphur.

According to the invention the sulphur is separated by distillation from the impurities or gangue with which it is associated by effecting the combustion of substantially the minimum proportion of the sulphur contained in the material treated to provide the whole of the heat necessary for the volatilization of the balance of the sulphur, leading away the sulphur vapours and condensing them.

Generally it will be desirable, or even necessary, to impart motion to the material under treatment in order to prevent, for instance, the extinguishing of combustion by the impurities and in some cases to effect the removal of the impurities or gangue with which the sulphur is associated.

In carrying the invention into effect, apparatus of the general character of the known sulphur burners or continuous roasting furnaces as, for instance, the Herreshöff or Wedge furnaces may be employed for vaporizing the sulphur.

When the usual sulphur burners are employed the combustion chamber ordinarily associated therewith will, however, be omitted and in all cases a condensing chamber will be associated with the apparatus in which the sulphur is vaporized.

In order to minimize the consumption of sulphur, which in any case will be small, for providing the necessary heat, the heat contained in the sulphur vapours and the combustion gas may be employed for heating the supply of air introduced into the sulphur for the oxidation of a portion thereof. When, however, the sulphur recovering or refining plant is associated with or in the neighbourhood of a plant requiring a supply of sulphur dioxide as, for instance, a sulphuric acid plant, the provision of means for recovering the heat carried away by the gases may be considered to be unnecessary.

The invention will be further described by way of example with reference to the accompanying drawings, in which:—

Figure 2:
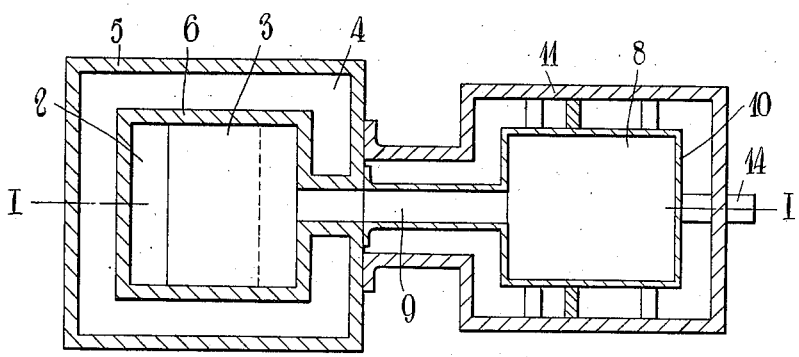

Figure 1 is an elevation in section on the plane indicated by the line I—I in Figure 2 of one form of apparatus which may conveniently be used, and

Figure 2 is a horizontal section on the plane indicated by the line II—II in Figure 1 of the same.

The crude sulphur is fed by a suitable feeding device 1 into a chamber 2 provided with a plurality of shelves 3 over which the molten sulphur is caused to travel in a zig-zag course. Flues 4 are arranged between the walls 5 and 6 of the chamber through which air may be passed on its way to an opening 7 in the lower portion of the chamber through which it is brought into contact with the sulphur, thereby oxidizing a portion of the same, the heat evolved being used for the vaporization of the remaining portion of the sulphur. The sulphur vapours together with the waste gases pass from this chamber into a second chamber 8 by way of a conduit 9 near the upper portion thereof. This second chamber is formed with double walls 10 and 11 through the space 12 between which the air required for combustion may be caused to travel in order to be heated, passing therefrom by the passage 13 into the flues above mentioned. This second chamber acts as a receiver for the molten sulphur which may be tapped off therefrom by way of the pipe 14 and an upwardly inclined pipe 15 is arranged in the upper portion of this chamber, such pipe being also provided with a jacket 16 through which air is caused to travel on its way to the jacketed receiver and thence to the flues and the sulphur condensed in this tube caused to reflux into the chamber from which the molten sulphur may be drawn off into suitable molds and allowed to cool.

Any other suitable condensing means may, however, be associated with the vaporizing chamber; thus, for instance, the condensing device may be arranged to yield the refined sulphur in the form of flowers of sulphur.

The sulphur obtained in this manner will be of a bright pale yellow colour and will burn freely as it will not be contaminated by asphaltic material or material of a petroleum-like character.

Having now described my invention, what I claim as new and desire to secure by Letters Patent is:—

1. The process of recovering sulphur from materials containing sulphur in the free state, which comprises effecting the combustion of substantially the minimum proportion of the sulphur contained in the material treated to provide the whole of the heat required for the volatilization of the balance of the sulphur, leading away the sulphur vapours and condensing them.

2. The process of recovering sulphur from materials containing sulphur in the free state, as claimed in claim 1, which comprises introducing the sulphur-containing materials into an enclosed space, effecting the combustion of a fraction of the total sulphur in the material therein sufficient to volatilize the remainder of the sulphur, leading the vapours of sulphur into a second enclosed space, cooling the vapours and collecting the condensed sulphur.

3. The process of recovering sulphur from materials containing sulphur in the free state, as claimed in claim 1, which comprises maintaining in motion the body of sulphur-containing material under treatment.

4. The process of recovering sulphur from materials containing sulphur in the free state, as claimed in claim 3, which comprises causing the oxygen containing gas to flow in counter-current in contact with the sulphur-containing material.

In testimony whereof I have signed my name to this specification.

CHARLES STANLEY ROBINSON.